US007087298B2

(12) United States Patent
Key

(10) Patent No.: US 7,087,298 B2
(45) Date of Patent: Aug. 8, 2006

(54) ROTATING LABEL SYSTEM

(75) Inventor: Stephen M. Key, Oakdale, CA (US)

(73) Assignee: Stephen Key Design, LLC, Modesto, CA (US)

( * ) Notice: Subject to any disclaimer, the term of this patent is extended or adjusted under 35 U.S.C. 154(b) by 0 days.

(21) Appl. No.: 10/005,428

(22) Filed: Dec. 3, 2001

(65) Prior Publication Data

US 2002/0038685 A1    Apr. 4, 2002

Related U.S. Application Data

(63) Continuation-in-part of application No. 09/551,985, filed on Apr. 15, 2000, now Pat. No. 6,402,872, which is a continuation-in-part of application No. 09/126, 010, filed on Jul. 29, 1998, now Pat. No. 6,086,697.

(51) Int. Cl.

*B32B 7/12* (2006.01)
*G09F 3/10* (2006.01)
*G09F 3/00* (2006.01)

(52) U.S. Cl. .................... 428/343; 428/41.9; 428/40.1; 428/354; 40/306; 40/310; 40/506; 215/252; 215/256; 215/206; 215/901

(58) Field of Classification Search ............... 428/41.9, 428/40.1, 343, 354; 40/306, 310, 506; 215/252, 215/256; 206/901

See application file for complete search history.

(56) References Cited

U.S. PATENT DOCUMENTS 736,035 A    8/1903 Stevenson (Continued)

FOREIGN PATENT DOCUMENTS

DK    85214    3/1958

(Continued)

OTHER PUBLICATIONS

U.S. Appl. No. 09/866,219, filed May 25, 2001, Key, Roll-Fed Method for Constructing a Rotatable Label System.

(Continued)

*Primary Examiner*—Daniel Zirker
(74) *Attorney, Agent, or Firm*—Carr & Ferrell LLP

(57) ABSTRACT

A system and method are disclosed for constructing a rotatable label and attaching the rotatable label to a container. The rotatable label may have a transparent portion and is temporarily secured to a container or an inner label that is permanently secured to the container via a temporary adhesive disposed on a leading edge of the rotatable label's back surface. Permanent adhesive is disposed on the trailing edge of the rotatable label's back surface. The rotatable label is then wrapped around the container so that the trailing edge of the rotatable label's back surface comes in contact with the rotatable label's front surface. The rotatable label is then rotated with respect to the inner label or container, thereby breaking the temporary bond formed by the temporary adhesive between the rotatable label and inner label or container. Alternatively, temporary adhesive may be disposed on the trailing edge of the rotatable label's back surface to allow the rotatable label to be easily removed from the container.

In another embodiment, the rotatable label includes a release tab releasably attached to an outer label. The release tab is adhered to the container, or to an inner label adhered to the container, to secure the outer label to the container while the outer label is wrapped around the container. The release tab may then be detached from the outer label to permit the outer label to be rotated about the container.

5 Claims, 13 Drawing Sheets

U.S. PATENT DOCUMENTS

| | | | | | |
|---|---|---|---|---|---|
| 1,054,826 | A | | 3/1913 | Cole | |
| 1,064,576 | A | | 6/1913 | Washburn | |
| 1,145,367 | A | | 7/1915 | Herter | |
| 1,312,611 | A | | 8/1919 | Chess | |
| 1,334,031 | A | | 3/1920 | Hahn | |
| 1,387,625 | A | | 8/1921 | Stein | |
| 1,486,313 | A | | 3/1924 | Van Antwerp | |
| 2,013,616 | A | | 9/1935 | Rettenmeyer | |
| 2,069,609 | A | | 2/1937 | Hanson | 40/306 |
| 2,129,364 | A | | 9/1938 | Simons et al. | |
| 2,441,607 | A | | 5/1948 | Walls | |
| 2,468,000 | A | | 4/1949 | Taylor | |
| 2,504,076 | A | | 4/1950 | Lindblom | |
| 2,706,464 | A | | 4/1955 | North | |
| 2,738,564 | A | | 3/1956 | Guianne | |
| 2,739,564 | A | | 3/1956 | North | |
| 2,844,893 | A | | 7/1958 | Keller | |
| 2,860,431 | A | | 11/1958 | Barnum | |
| 2,931,657 | A | | 4/1960 | Lewis | |
| 2,935,814 | A | | 5/1960 | Freeze | |
| 2,971,283 | A | | 2/1961 | Parker | |
| 3,278,182 | A | | 10/1966 | Lescher | |
| 3,374,911 | A | | 3/1968 | White | |
| 3,468,467 | A | * | 9/1969 | Amberg | 229/1.5 |
| 3,488,880 | A | | 1/1970 | Taylor | |
| 3,523,623 | A | | 8/1970 | Dorn | |
| 3,542,229 | A | | 11/1970 | Beyerlein et al. | |
| 3,604,584 | A | | 9/1971 | Shank | |
| 3,733,002 | A | | 5/1973 | Fujio | |
| 3,750,317 | A | | 8/1973 | Morgan | |
| 3,874,977 | A | | 4/1975 | Pyles | |
| 3,960,713 | A | | 6/1976 | Carey | |
| 4,044,889 | A | | 8/1977 | Orentreich et al. | |
| 4,057,251 | A | | 11/1977 | Jones et al. | |
| 4,072,553 | A | | 2/1978 | Braker et al. | |
| 4,203,240 | A | | 5/1980 | Goodwin | |
| 4,312,523 | A | | 1/1982 | Haines | |
| 4,381,615 | A | | 5/1983 | Lonsmin | |
| 4,405,045 | A | | 9/1983 | Villa-Real | |
| 4,505,497 | A | | 3/1985 | Katzman | |
| 4,567,681 | A | | 2/1986 | Fumei | |
| 4,658,974 | A | | 4/1987 | Fujita et al. | |
| 4,724,973 | A | | 2/1988 | Shah | |
| 4,727,667 | A | * | 3/1988 | Ingle | 40/306 |
| 4,732,411 | A | | 3/1988 | Siegel | |
| 4,844,760 | A | | 7/1989 | Dickey | |
| 4,877,119 | A | | 10/1989 | Hosking | |
| 4,918,604 | A | | 4/1990 | Baum | |
| 5,076,613 | A | | 12/1991 | Kovacs | |
| 5,116,452 | A | | 5/1992 | Eder | |
| 5,154,448 | A | | 10/1992 | Griffin et al. | |
| 5,207,011 | A | | 5/1993 | Coulthard | |
| 5,209,367 | A | | 5/1993 | Van Musscher et al. | |
| 5,321,933 | A | | 6/1994 | Seifert et al. | |
| 5,324,559 | A | | 6/1994 | Brombacher | |
| 5,342,093 | A | | 8/1994 | Weernink | |
| 5,363,576 | A | | 11/1994 | Piana et al. | |
| 5,403,635 | A | | 4/1995 | Hoffman | |
| 5,403,636 | A | | 4/1995 | Crum | |
| 5,484,167 | A | | 1/1996 | Donaldson et al. | |
| 5,525,383 | A | | 6/1996 | Witkowski | |
| 5,605,230 | A | | 2/1997 | Marino, Jr. et al. | |
| 5,639,529 | A | | 6/1997 | Gozdecki et al. | |
| 5,712,021 | A | | 1/1998 | Hernandez | |
| 5,727,766 | A | | 3/1998 | Mayo | |
| 5,800,893 | A | | 9/1998 | Harden | |
| 5,809,674 | A | | 9/1998 | Key | |
| 5,842,633 | A | | 12/1998 | Nurse | |
| 5,883,370 | A | | 3/1999 | Walker et al. | |
| 5,884,421 | A | | 3/1999 | Key | |
| 5,953,170 | A | | 9/1999 | Glancy | |
| 6,047,488 | A | | 4/2000 | Tuszkiewicz | |
| 6,086,697 | A | | 7/2000 | Key | |
| 6,129,802 | A | | 10/2000 | Key | |
| 6,129,959 | A | | 10/2000 | Mercer et al. | |
| 6,158,612 | A | | 12/2000 | Alpert | |
| 6,212,803 | B1 | | 4/2001 | Key | |
| 6,237,269 | B1 | | 5/2001 | Key | |
| 6,253,438 | B1 | | 7/2001 | Jespersen | |
| 6,254,138 | B1 | | 7/2001 | Rawlings et al. | |
| 6,258,200 | B1 | | 7/2001 | Kassab | |
| 6,360,462 | B1 | | 3/2002 | Mengel | |
| 6,385,878 | B1 | | 5/2002 | Key | |
| 6,402,872 | B1 | | 6/2002 | Key | |
| 6,454,094 | B1 | | 9/2002 | Salani | |
| 6,631,578 | B1 | | 10/2003 | Key | |
| 6,649,007 | B1 | | 11/2003 | Key | |
| 2001/0025442 | A1 | * | 10/2001 | Key | 40/638 |
| 2004/0247863 | A1 | | 12/2004 | Scott | |

FOREIGN PATENT DOCUMENTS

| | | |
|---|---|---|
| FR | 965522 | 9/1950 |
| FR | 1114750 | 4/1956 |
| FR | 1347102 | 11/1963 |
| FR | 2460260 | 1/1981 |
| FR | 285514 | 10/1988 |
| FR | 2677786 | 12/1992 |
| IT | 327286 | 7/1935 |
| SE | 1565 | 7/1888 |
| WO | WO 98/19289 | 5/1998 |
| WO | WO 00/48161 | 8/2000 |

OTHER PUBLICATIONS

U.S. Appl. No. 10/112,542, filed Mar. 27, 2002, Key, System and Method for a Rotatable Sleeve Device.

U.S. Appl. No. 10/030,321, filed Oct. 26, 2001, Key, Rotatable Label for Pharmaceutical Container and Method for Constructing Same.

* cited by examiner

ROTATING LABEL SYSTEM

CROSS REFERENCE TO RELATED APPLICATION

This application is a divisional application of U.S. patent application Ser. No. 09/551,985 filed Apr. 15, 2000, now U.S. Pat. No. 6,402,872 entitled "Rotating Label System and Method" which is a continuation-in-part of U.S. Ser. No. 09/126,010 filed on Jul. 29, 1998 commonly assigned U.S. Pat. No. 6,086,697 issued Jul. 11, 2000 and entitled "Rotating Label System and Method" by Stephen M. Key, the disclosure of which is hereby incorporated by reference. The present application is also related to and incorporates by reference the following patents and patent application: (i) U.S. Pat. No. 6,237,269 issued May 29, 2001 for an invention entitled "Roll-Fed Method for Constructing a Rotatable Label System"; (ii) U.S. Pat. No. 5,809,674 issued Sep. 22, 1998, entitled "Apparatus and Method For Increasing An Effective Information Carrying Surface Area On A Container"; (iii) U.S. Pat. No. 5,884,421 issued Mar. 23, 1999 entitled "Apparatus and Method for Constructing a Rotatable Label Device"; (iv) U.S. Pat. No. 6,129,802 issued Oct. 10, 2000, entitled "Rotatable Label System and Method for Constructing the Same"; and (v) U.S. patent application Ser. No. 09/247,245 filed Feb. 9, 1999 entitled "Rotatable label System Including Tamper-Evident Feature And Method For Constructing Same".

BACKGROUND OF THE INVENTION

1. Field of the Invention

The present invention relates generally to rotatable labels, and more particularly to a system and method for constructing a rotatable label device.

2. Description of the Background Art

Most consumer product containers are labeled with various types of information, such as product directions for use, warnings, dosage amounts, ingredients, advertisements, artwork, and the like. This information normally takes the form of written indicia presented on a label wrapped around the container. In many instances, however, the available space on a single label is insufficient to display all the information a product manufacturer may wish to present.

To provide additional space for the presentation of information on a given container, it has been proposed that an outer label positioned around an inner label may be employed. The outer label typically has a transparent portion and, by rotating the outer label relative to an inner label attached to the container, the information on the inner label can be viewed through the transparent portion. Such a construction permits information to be presented on both the outer and inner labels, thus substantially increasing the available space upon which information may be presented.

Despite the advantages of having a rotating label on a container, it has been cumbersome to employ rotating labels, in most circumstances due, to the high cost and difficulty of applying such a rotating label to a container. One significant difficulty has been that the cost of applying rotating labels to containers (on a mass production scale) has been prohibitive for many applications. Conventionally, labels are applied to containers by applying a permanent adhesive to either the label or the container and then wrapping the label around the container to adhere the label to the container. This manner of application yields a label that is fixed, and not rotatable, relative to the container. This manner of application has, in the past, not been useful in mounting rotatable labels to containers because of the need for the rotatable label to rotate about, and not be permanently affixed to, the container.

Consequently, a need exists to provide a system and method by which a rotatable label may be cost-effectively mounted on a container without preventing the label from being rotatable relative to the container. Additionally, a need exists to provide an effective manner of mounting a rotating label to a container utilizing conventional label application machinery.

SUMMARY OF THE INVENTION

The present invention overcomes or substantially alleviates prior problems associated with the provision of a rotatable label. In general, an outer label, having a temporary adhesive disposed on a back surface adjacent to the label's leading edge, is temporarily coupled to a container. The outer label is then wrapped and secured around the container by placing the back surface trailing edge of the label, which has a permanent adhesive disposed on it, in contact with the leading edge front surface of the outer label. After the outer label is permanently secured about the container, the outer label is rotated relative to the container thereby subjecting the temporary adhesion to shear stresses and causing the temporary adhesion between the outer label and the inner container to fail. Once the temporary adhesion between the outer label and the container has been broken, the outer label may freely rotate about the container. Hence, the temporary adhesive temporarily couples the outer label to the container while the label is being wrapped about the container, but easily breaks free to permit the outer label to rotate relative to the container.

An alternative embodiment of the present invention entails applying the temporary adhesive to the container's exterior surface instead of applying the temporary adhesive to the back surface of the outer label. In another embodiment, the container has a fixed inner label and an outer rotatable label is coupled to the container via the fixed inner label. In addition to the above embodiments, in order to facilitate rotation of the outer label with respect to the inner label, a slip agent can be applied between the back surface of the outer label and the front surface of the inner label.

Additional features, advantages, and details will be apparent from the drawings and the detailed description as set forth below.

DETAILED DESCRIPTION OF THE PREFERRED EMBODIMENT

Figure 1:
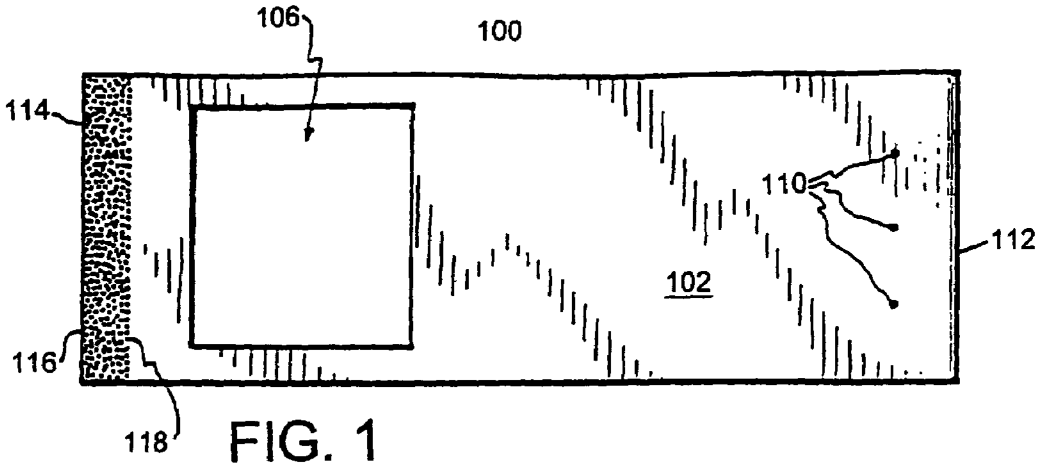
FIG. 1 is side elevational view of a label according to one embodiment of the present invention.
Figure 2:
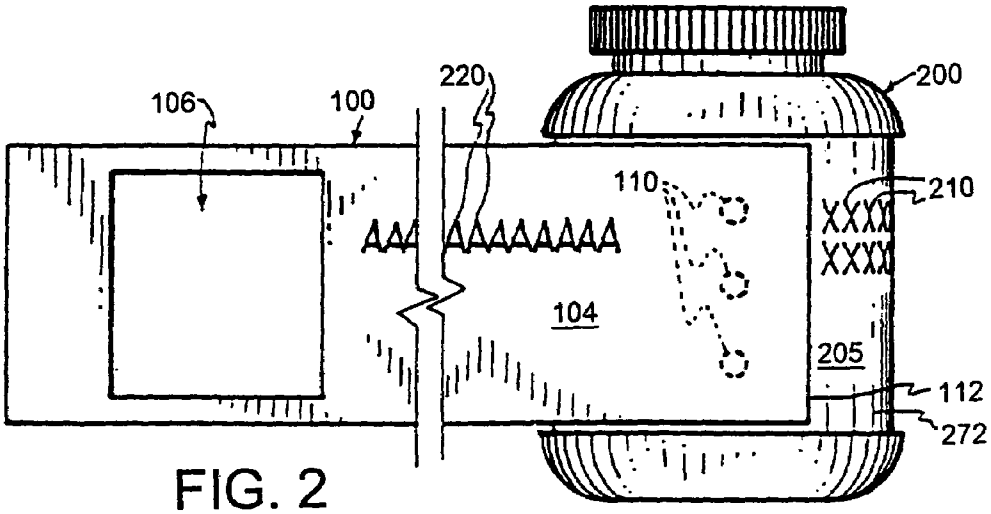
FIG. 2 illustrates the label of FIG. 1 adhered to a container.

FIGS. 1–4 illustrate one embodiment of a rotatable label system and method according to the present invention. Specifically, FIGS. 1 and 2 illustrate an outer label 100 as having a back surface 102, a front surface 104, and a transparent window 106. The outer label 100, as well as inner label 205, in this embodiment and the embodiments described below, may be made of paper or plastic film (for use in a wet environment) or any other material appropriate for container labels. As shown, written indicia 220 is disposed on the outer label front surface 104.

An adhesive 110, such as glue droplets or dots, is disposed on the outer label back surface 102 adjacent to a label leading edge 112 for temporarily adhering or coupling the outer label 100 to the inner label 205 as discussed below. In one embodiment, the adhesive 110 is temporary adhesive. Alternatively, the adhesive 110 is disposed on the inner label front surface 272. In another embodiment, there is no inner label 205 and the adhesive 110 is disposed directly on an exterior surface of the container 200. Further note that instead of temporary adhesive, other materials or methods may be used to temporary couple the outer label 100 to the inner label 205 such as applying water between the inner label 205 and the outer label 100, providing static electricity between the inner label 205 and the outer label 100, or applying a pressure to the outer label (e.g., near a leading edge 112) positioned against the container 200. An advantage to using adhesive alternatives is that it makes recycling of the inner label 205 and the outer label 100 easier.

A permanent adhesive 114 is also disposed on the outer label back surface 102 adjacent to an outer label trailing edge 116 and is further defined by an edge 118. Alternatively, adhesive 114 comprises a temporary adhesive to allow the outer label 100 to be easily removed from about the container 200. Once the outer label 100 is removed from the container 200, the label 100 could then be used as a game piece or coupon and/or have written indicia disposed on the back surface 102 of outer label 100.

Preferably, with the exception of the adhesive 110 and the adhesive 114, the label back surface 102 is substantially non-adhesive. Also note that a slip agent may be applied to outer label back surface 102 and/or inner label front surface 272 in this embodiment or the embodiments discussed below to create a coefficient of friction between 1.5 to 2.0 between the surfaces 102 and 272. The slip agent also prevents temporary adhesive 110 from getting into the pores of inner label front surface 272, thereby further lessening the strength of the bond between surfaces 102 and 272.

In this embodiment, and the embodiments discussed below, inner label front surface 272 may be coated with a varnish. The varnish impedes adhesive 110 from making a strong, permanent bond with inner label front surface 272. Further, if inner label 205 is coated with a varnish or a slip agent, the temporary adhesive can be replaced with a permanent adhesive, which will not permanently adhere to the inner label front surface 272 due to the presence of the varnish or slip agent disposed thereon.

As shown in FIG. 2, the outer label 100 is temporarily adhered or coupled to the front surface 272 of the fixed inner label 205 by the adhesive 100 or other adhesive alternatives to temporarily secure the outer label 100 to the container 200. Specifically, by coupling the outer label 100 to the inner label 205 with only the adhesive 110, the adhesive 110 acts to temporarily secure the outer label 100 to the container 200 (e.g., via inner label 205) while the outer label 100 is wrapped and secured about the container 200. The adhesive 110 is configured to permit the outer label 100 to be detached from the inner label 205 once the outer label 100 is secured about the container 200, such that the outer label 100 may be rotated relative to the inner label 205 and the container 200 as discussed below. It should be understood that while FIG. 2 illustrates the adhesive 110 as including three glue dots disposed on the outer label back surface 102, those skilled in the art will appreciate that different numbers, sizes, shapes, and patterns of adhesive 110 may also be effectively employed. Further, the adhesive 110 may be applied to a front surface on the inner label 205. Those skilled in the art will appreciate however, that the different numbers, sizes, shapes, and patterns of adhesive 110 may also be effectively employed.

Preferably, the adhesive 110 should be in a sufficient amount, size, and geometry to temporarily adhere the outer label 100 to the inner label 205 while the outer label 100 is wrapped around the container 200. The adhesive 110 should also permit the adhered connection of the outer label 100 and the inner label 205 along the dots 110 to be easily broken by rotating the outer label 100 relative to the inner label 205 as discussed below. To accomplish this result, an adhesive that has decreased adhesive strength over time, such as a time-release adhesive, may be employed. An example of an acceptable adhesive 110 for this embodiment and the embodiments discussed below (also referred to herein as temporary adhesive) is hot pick-up cement sold under product number 284-332 by Ato Findlay Inc. of Milwaukee, Wis. An example of an acceptable permanent adhesive 114 is hot melt adhesive sold under product number 335-335 by Ato Findlay Inc. of Milwaukee, Wis.

Hot pickup cement 284-332 is a resin with a soft point of 165° F. It typically comes in the form of pick-ets (pellets) and has a low viscosity of about 278 cP at 250 °F. at 100 rpm. Its normal operating range is about 250° to 275° F. and has a staining point of 150° F. This temporary adhesive has an excellent pick-up bond that cools to a brittle bond, which is easily broken.

Hot melt adhesive 335-335 has a softening point of 162° F. and a thermal viscosity of 1,240 cP at 325° F. at 100 rpm. The density of hot melt adhesive 335-335 is 0.98 g/cc and has a suggested running temperature of 320° F. to 340° F. This permanent adhesive is versatile and adheres well to a variety of surfaces.

Figure 3:
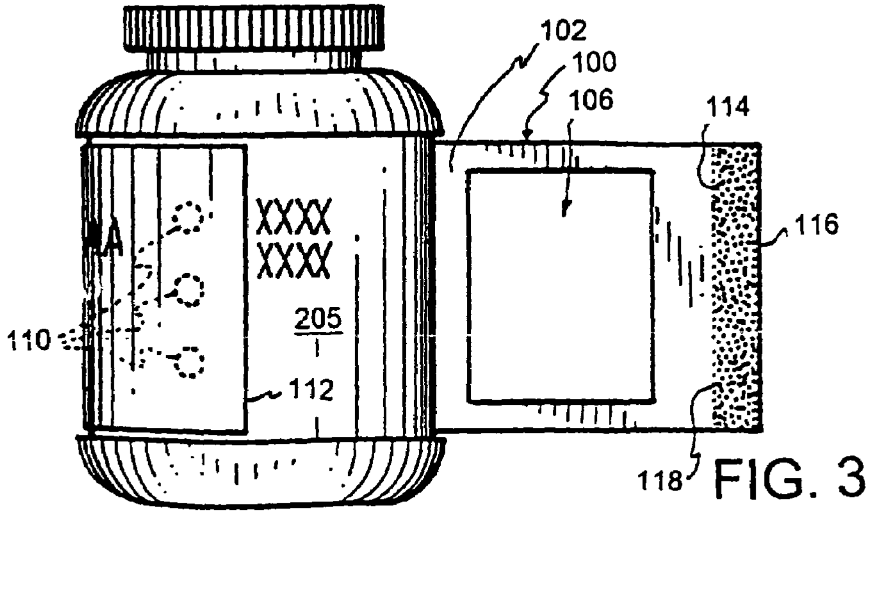
FIG. 3 illustrates the label of FIG. 1 partially wrapped about the container of FIG. 2.

FIG. 3 illustrates the outer label 100 partially wrapped about the container 200. As shown, the adhesive 110 (illustrated in phantom) maintains the outer label 100 temporarily adhered to the inner label 205 and, thus, temporarily secured to the container 200. The outer label 100 is then moved from the position illustrated in FIG. 3 to the position illustrated in FIG. 4 to secure the outer label 100 about the container 200. In particular, the outer label back surface 102 is adhered to the outer label front surface 104 by the adhesive 114 disposed on the outer label back surface 102 to secure the outer label 100 about the container 200.

Figure 5:
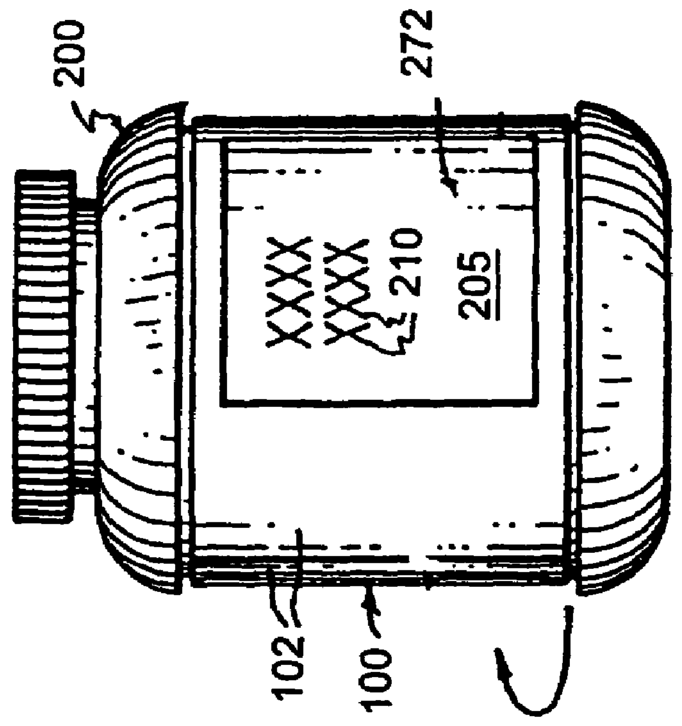
FIG. 5 illustrates the label of FIG. 1 rotatably mounted on the container of FIG. 2.
Figure 4:
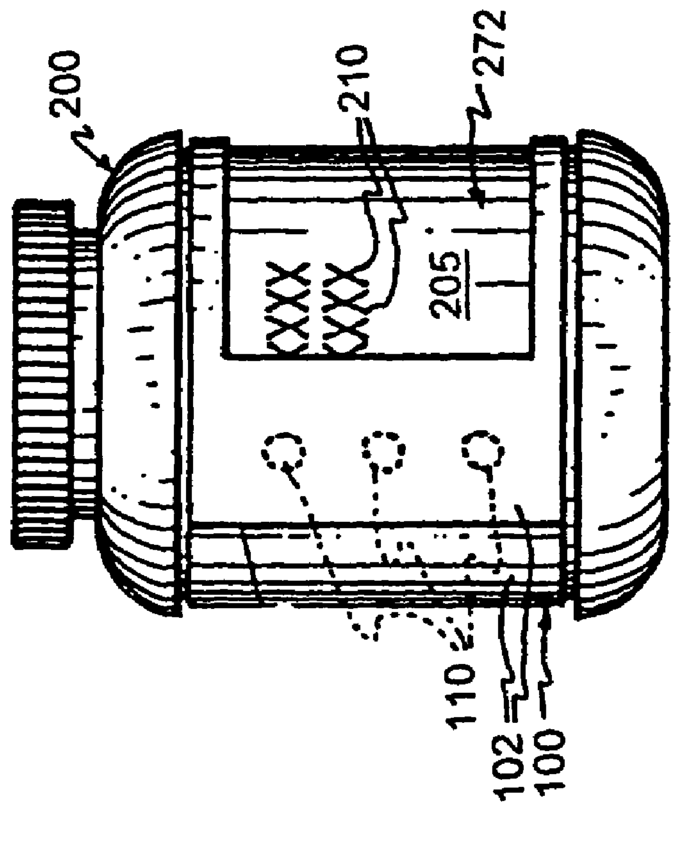
FIG. 4 illustrates the label of FIG. 1 secured about the container of FIG. 2.

With the outer label 100 secured about the container 200 as shown in FIG. 4, the outer label 100 is then rotated relative to the inner label 205 to detach the outer label 100 from inner label 205 to permit the outer label 100 to rotate about the container 200. Specifically, rotating the outer label 100 from the position shown in FIG. 4 to the position shown in FIG. 5 subjects the adhesive 110 to shear stresses. These shear stresses cause the adhered connection of the inner label 205 to the outer label 100 to fail along the adhesive 110 to permit the outer label 100 to rotate relative to the inner label 205. By permitting the outer label 100 to rotate relative to the inner label 205, the written indicia 210 disposed on the inner label front surface 272 may be viewed through the transparent window 106.

Figure 6:
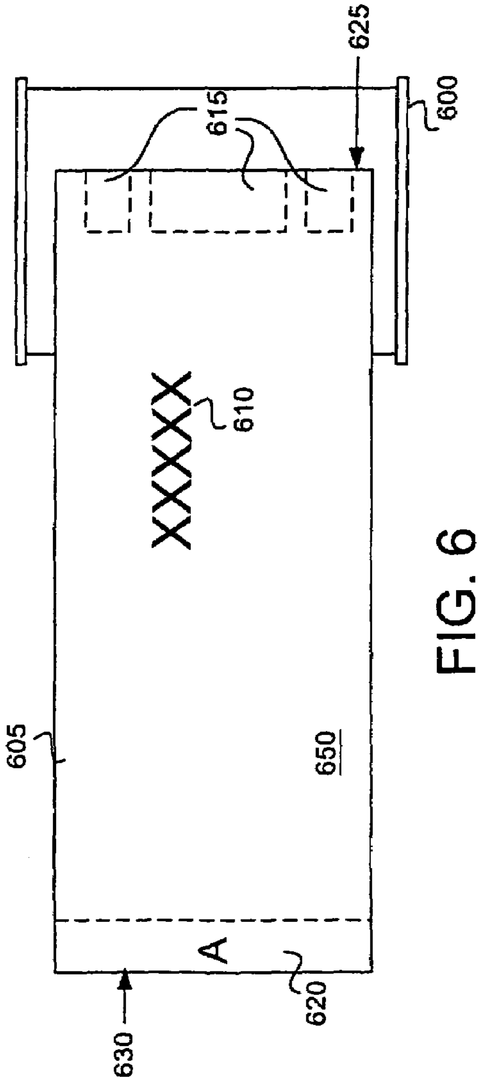
FIG. 6 illustrates an inner label partially secured to a container according to another embodiment of the invention.
Figure 7:
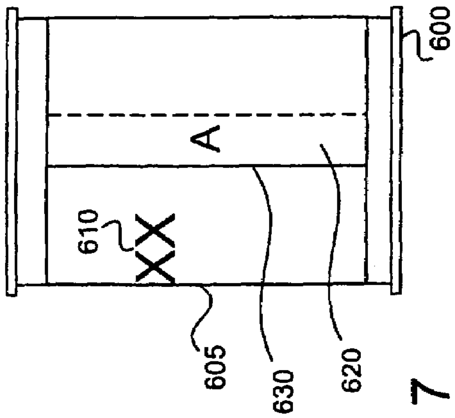
FIG. 7 illustrates the inner label of FIG. 6 permanently secured to the container of FIG. 6.

FIGS. 6–12 illustrate another embodiment of a rotatable label according to the present invention. FIGS. 6 and 7 show an inner label 605 being permanently secured to a container 600 via a permanent adhesive 615 (illustrated with phantom lines) disposed preferably on container 600. However, those skilled in the art will appreciate that adhesive 615 can alternatively be disposed adjacent to a leading edge 625 of an inner label 605 back surface.

In addition, a permanent adhesive 620 (illustrated with phantom lines) is disposed adjacent to trailing edge 630 on the back surface of inner label 605. As shown in FIG. 7, the inner label 605 is wrapped around container 600 and the rear surface is secured to the front surface 650 of the inner label 605 via the permanent adhesive 620, thereby permanently securing inner label 605 around container 600. Those skilled in the art will appreciate that a variety of conventional methods may be employed for permanently securing the non-rotatable label 605 around the container 600 may be employed to secure inner label 605 about container 600.

Figure 8:
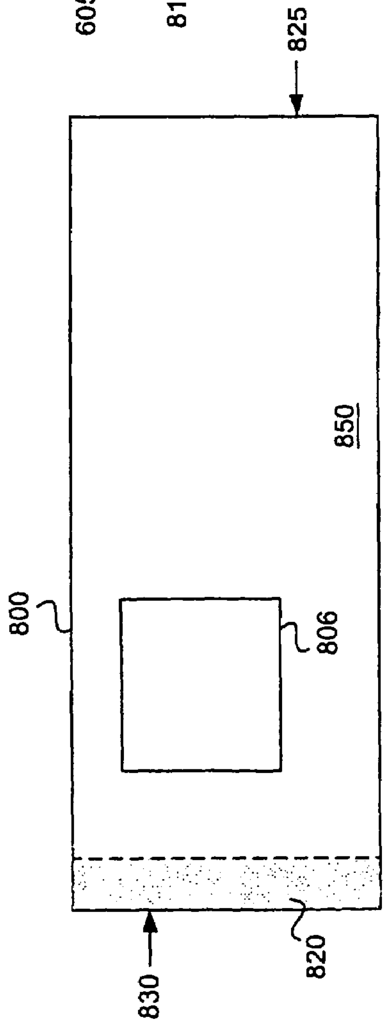
FIG. 8 illustrates the back surface of a rotatable label according to the FIG. 6 embodiment.

FIG. 8 shows a back surface 850 of a rotatable outer label 800. Outer label 800 is similar to outer label 100 (FIG. 1) in that the label 800 includes a transparent region 806 and has a permanent adhesive 820 disposed adjacent to a trailing edge 830 on the label back surface 850. However, the outer label 800 does not have a temporary adhesive disposed on the back surface 850 of outer label 800 adjacent to leading edge 825. Alternatively, adhesive 820 comprises a temporary adhesive to allow the outer label 800 to be easily removed from about the container 600. Once the outer label 800 is removed from the container 200, the label 800 could then be used as a game piece or coupon and/or have written indicia disposed on the back surface 850 of outer label 800.

Figure 9:
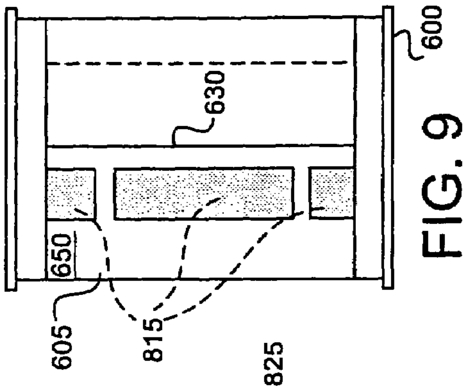
FIG. 9 illustrates the inner label of FIG. 6 having temporary adhesive disposed on its outer surface.

Instead, as shown in FIG. 9, labeling machinery (not shown) places temporary adhesive 815 onto the front surface 650 of the inner label 605. Those skilled in the art will appreciate that the labeling machinery can place the temporary adhesive 815 on to inner label 605 in a variety of patterns, including the patterns shown in FIGS. 1 (three dots), 9 (three rectangular areas) and 13 (four rectangular areas). Preferably, the patterns are not solid strips of adhesive to permit the labeling machinery claws to grip the labels without getting adhesive on the claws.

Figure 10:
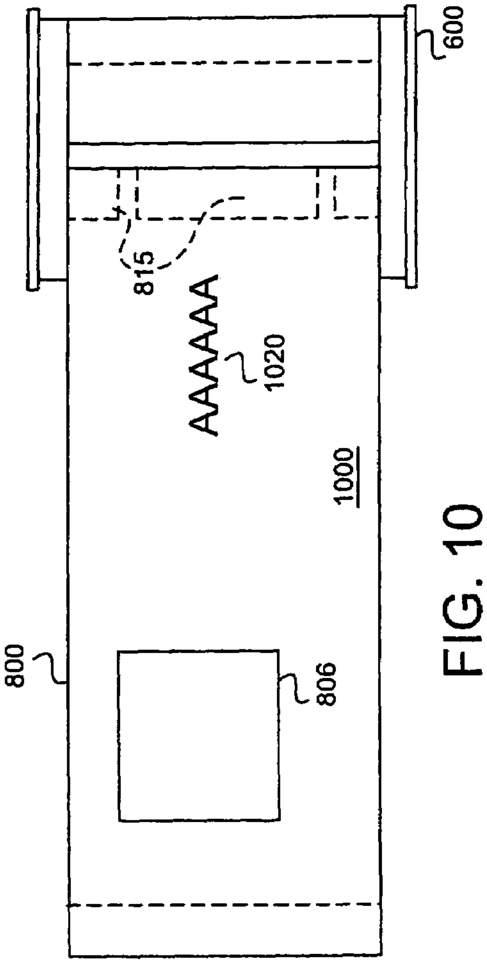
FIG. 10 illustrates the rotatable label of FIG. 8 temporarily secured to the inner label of FIG. 6.
Figure 12:
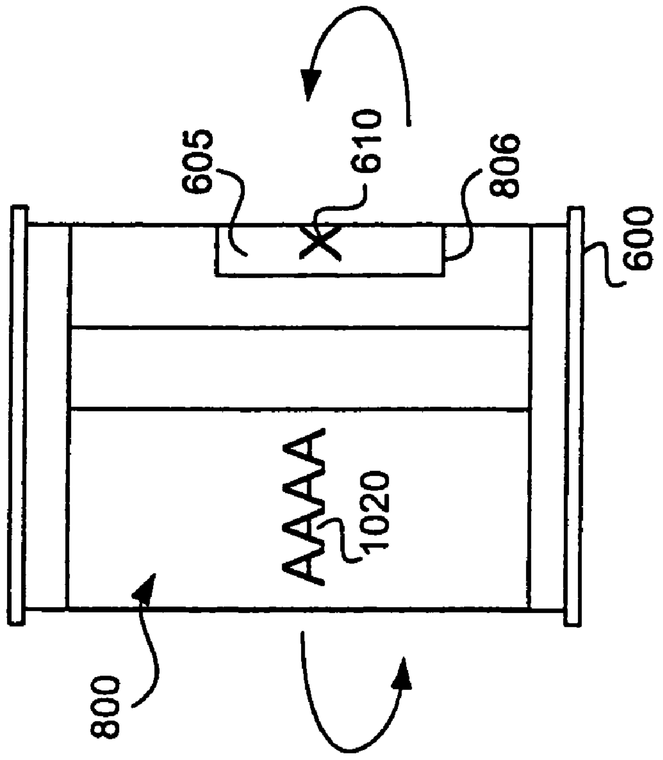
FIG. 12 illustrates the rotatable label of FIG. 8 rotatably mounted to the container of FIG. 6.

As shown in FIG. 10, the temporary adhesive 815 (illustrated in phantom) maintains the outer label 800 temporarily adhered to the inner label 600 and, thus, temporarily secured to the container 600. The outer label 800 is then moved from the position illustrated in FIG. 10 to the position illustrated in FIG. 11 to secure the outer label 800 about the container 600. In particular, the outer label 800 back surface 850 is adhered to the outer label 800 front surface 1000 by the permanent adhesive 820 disposed on the outer label 800 back surface 850 to secure the outer label 800 about the container 600.

Figure 11:
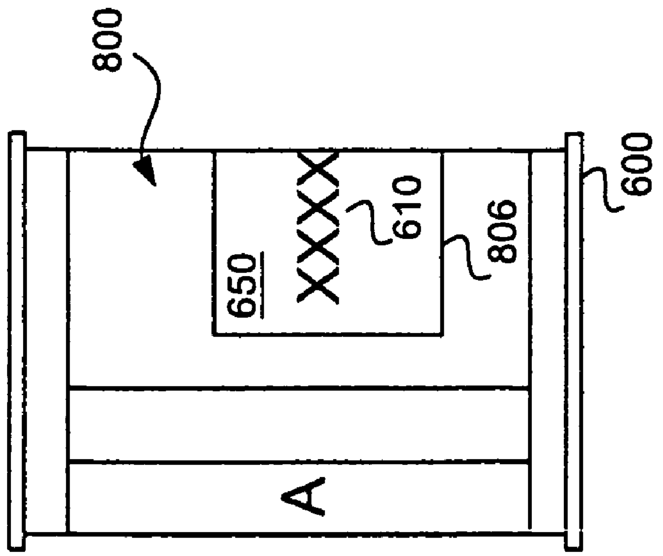
FIG. 11 illustrates the rotatable label of FIG. 8 temporarily secured around the container of FIG. 6.
Figure 14:
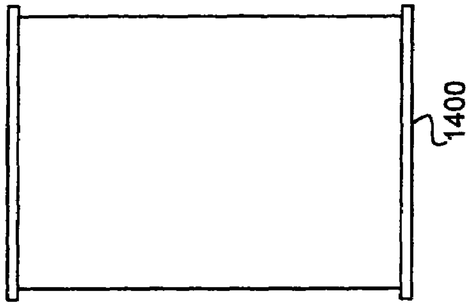
FIG. 14 illustrates a container for mounting the inner label of FIG. 13.

With the outer label 800 secured about the container 600 as shown in FIG. 11, the outer label 800 is then rotated relative to the inner label 605 to detach the outer label 800 from inner label 605 to permit the outer label 800 to rotate about the container 600. Specifically, rotating the outer label 800 from the position shown in FIG. 11 to the position shown in FIG. 12 subjects the temporary adhesive 815 to shear stresses. These shear stresses cause the adhesive bond between the inner label 605 to the outer label 800 to fail along the temporary adhesive 815 to permit the outer label 800 to rotate relative to the inner label 605. By permitting the outer label 800 to rotate relative to the inner label 605, the written indicia 610 disposed on the inner label front surface 650 may be viewed through the transparent window 806.

Figure 13:
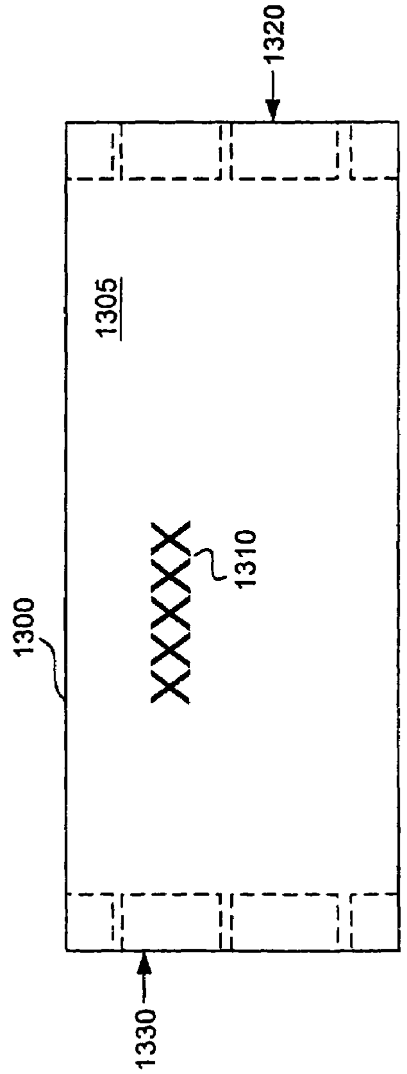
FIG. 13 illustrates the front surface of an inner label according to yet another embodiment of the present invention.
Figure 15:
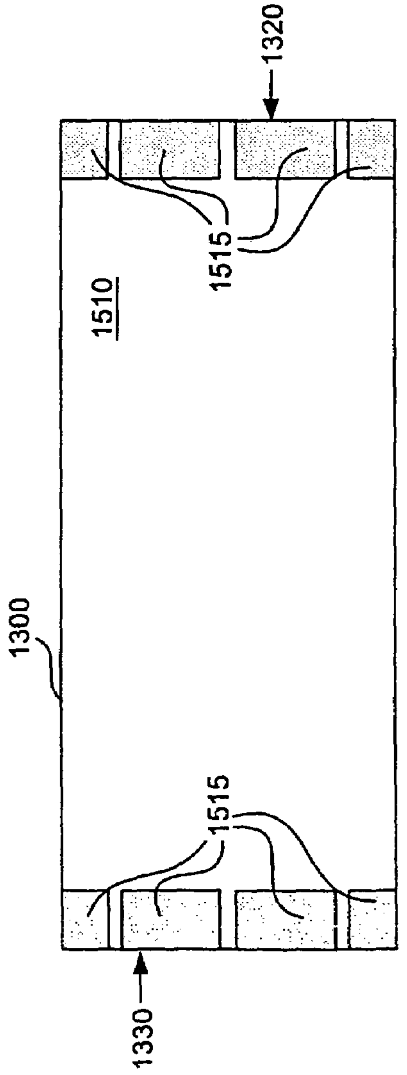
FIG. 15 illustrates the back surface of the inner label of FIG. 13.
Figure 16:
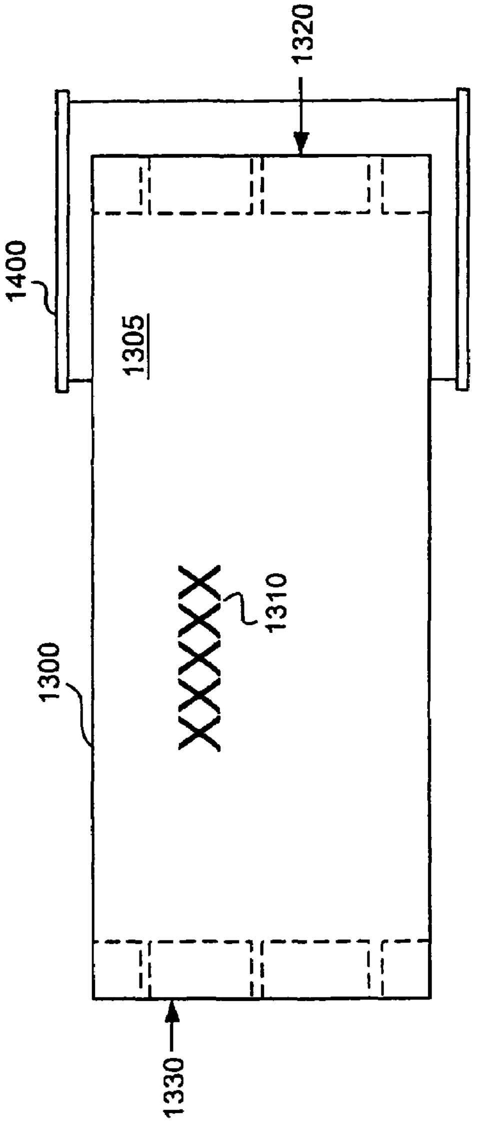
FIG. 16 illustrates the inner label of FIG. 13 partially secured to the container of FIG. 14.
Figure 17:
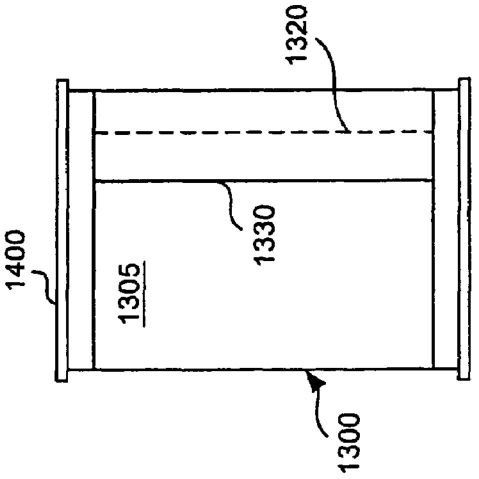
FIG. 17 illustrates the inner label of FIG. 13 permanently secured to the container of FIG. 14.
Figure 19:
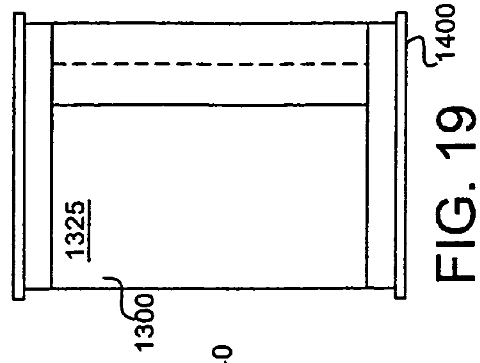
FIG. 19 illustrates the inner label of FIG. 13 permanently secured to the container of FIG. 14.

FIGS. 13–22 show yet another embodiment of a rotatable label according to the present invention. FIG. 13 shows a front surface 1305 of an inner label 1300 to be permanently secured to a container 1400 of FIG. 14. FIG. 15 shows a back surface 1510 of the inner label 1300. Permanent adhesive 1515 is disposed adjacent to both a leading edge 1320 and a trailing edge 1330 of the back surface 1510 of the inner label 1300. As shown in FIGS. 16 and 17, the inner label 1300 is secured around the container 1400 by first adhering the leading edge 1320 to the container 1400, wrapping the label 1330 about the container 1400, and then adhering the trailing edge via the front surface 1305 of inner label 1300 via permanent adhesive 1515, thereby permanently securing inner label 1300 around container 1400.

Figure 18:
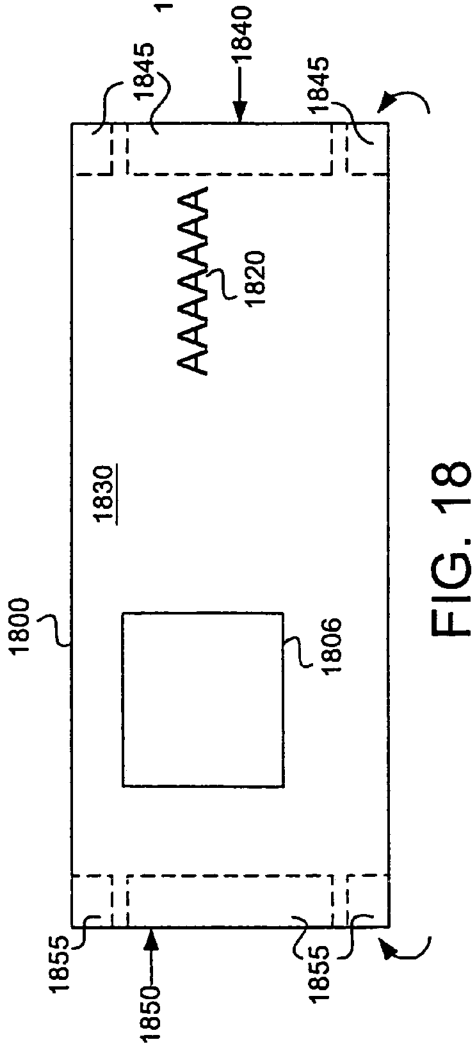
FIG. 18 illustrates a rotatable label for mounting on the container of FIG. 14.

FIG. 18 shows the front surface 1830 of a rotatable outer label 1800. Outer label 1800 is similar to outer label 800 (FIG. 8) in that the outer label 800 includes a transparent region 1806 and has a temporary adhesive 1845 disposed adjacent to the leading edge 1840 on the back surface. Further, outer label 1800 has a permanent adhesive 1855 disposed on the back surface of label 1800 adjacent to trailing edge 1850. Alternatively, adhesive 1855 comprises a temporary adhesive to allow the outer label 1800 to be easily removed from about the container 1400. Once the outer label 1800 is removed from the container 1400, the label 1800 could then be used as a game piece or coupon and/or have written indicia disposed on a back surface of outer label 1800.

Figure 20:
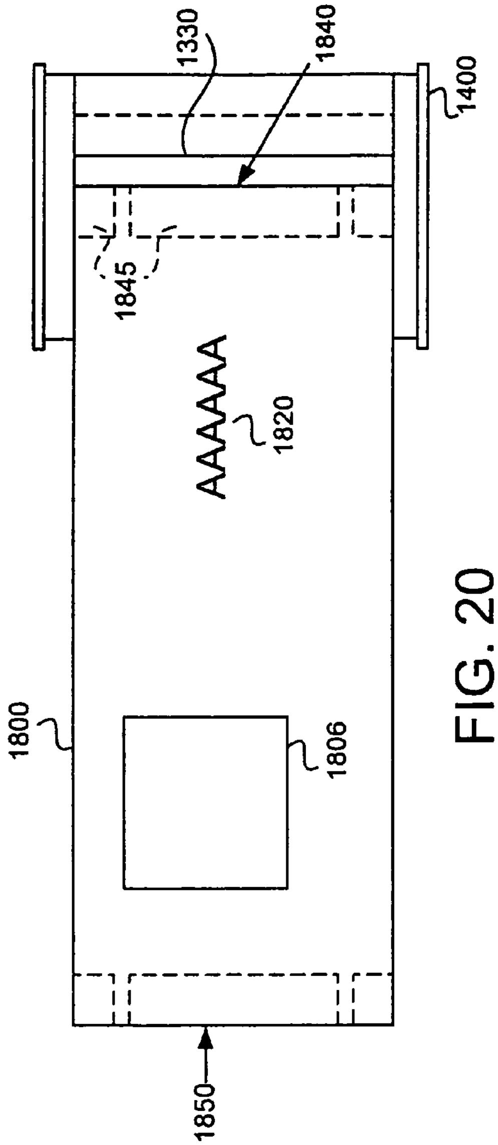
FIG. 20 illustrates the rotatable label of FIG. 18 partially secured to the inner label of FIG. 13 that is permanently secured to the container of FIG. 14.
Figure 22:
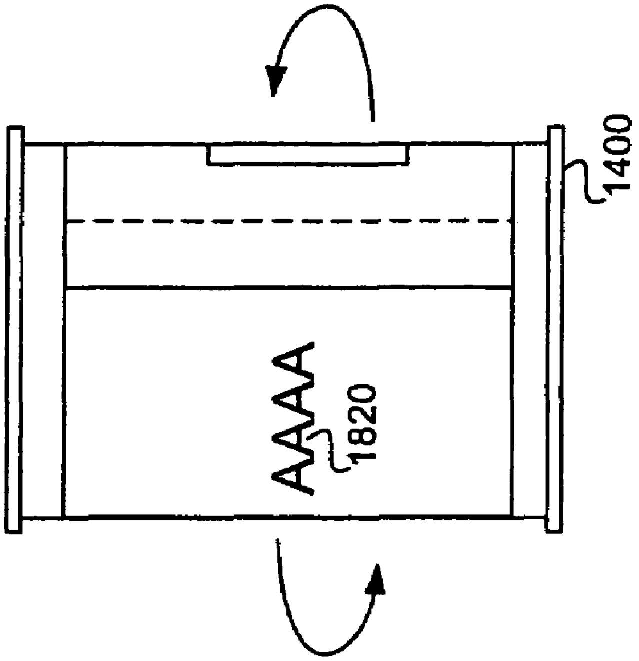
FIG. 22 illustrates the rotatable label of FIG. 18 rotatably mounted to the container of FIG. 14.

In this embodiment, labeling machinery (not shown) may be used to cut the outer label 1800 from a roll of labels before applying the outer label 1800 to container 1400 as shown in FIG. 20.

In FIG. 20, the temporary adhesive 1845 (illustrated in phantom) maintains the outer label 1800 temporarily adhered to the inner label 1300 front surface 1305 and, thus, temporarily secured to the container 1400. The outer label 1800 is then moved from the position illustrated in FIG. 20 to the position illustrated in FIG. 21 to secure the outer label 1800 about the container 1400. In particular, the outer label 1800 back surface is adhered to the outer label 1800 front surface 1830 by the permanent adhesive 1855 disposed on the outer label 1800 back surface to secure the outer label 1800 about the container 1400.

Figure 21:
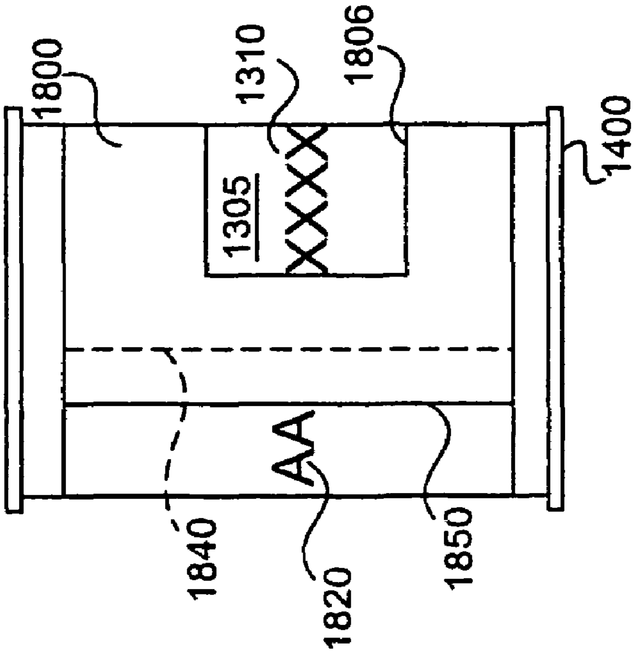
FIG. 21 illustrates the rotatable label of FIG. 18 temporarily secured to the inner of FIG. 13.

With the outer label 1800 secured about the container 1400 as shown in FIG. 21, the outer label 1800 is then rotated relative to the inner label 1300 to detach the outer label 1800 from inner label 1300 to permit the outer label 1800 to rotate about the container 1400. Specifically, rotating the outer label 1800 from the position shown in FIG. 21 to the position shown in FIG. 22 subjects the temporary adhesive 1840 to shear stresses. These shear stresses cause the adhesive bond created between the inner label 1300 and the outer label 1800 to fail along the temporary adhesive 1840 to permit the outer label 1800 to rotate relative to the inner label 1300. By permitting the outer label 1800 to rotate relative to the inner label 1300, the written indicia 1310 disposed on the inner label front surface 1305 may be viewed through the transparent window 1806.

Figure 23:
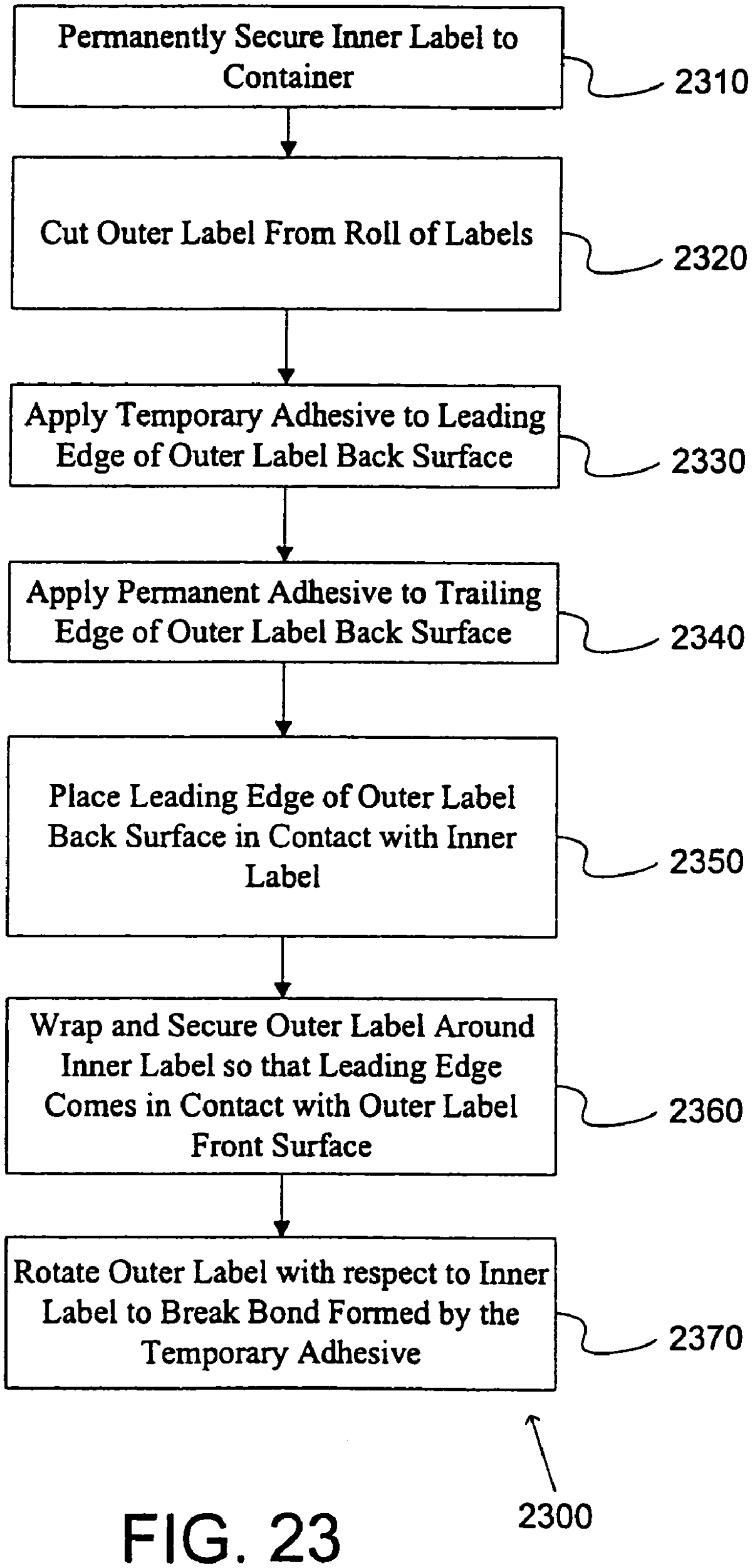
FIG. 23 illustrates a flowchart of steps for constructing a rotatable label system according to one embodiment of the present invention.

FIG. 23 is a flowchart 2300 illustrating steps for constructing a rotatable label system according to one embodiment of the present invention. The method 2300 may be employed with the labels described above in conjunction with FIGS. 13–22. At step 2310, roll fed labeling machinery permanently secures an inner label to a container. Alternatively, step 2310 can be skipped and instead text can be printed directly on the container. At step 2320, the label machinery cuts the outer label from a roll of labels. Note that the label machinery can alternatively cut the outer label from the roll of labels simultaneously with step 2340, or even earlier in the process. At step 2330, labeling machinery applies temporary adhesive to the leading edge of the outer label back surface. At step 2340, labeling machinery applies permanent adhesive to the trailing edge of the outer label back surface. Alternatively, the temporary adhesive can be applied to the inner label front surface or to an exterior surface of the container if there is no inner label.

At step 2350, labeling machinery places the leading edge of the outer label back surface in contact with the inner label, thereby temporarily securing, or adhering, the outer label to the inner label. At step 2360, the labeling machinery wraps and secures the outer label around the inner label so that the trailing edge of outer label back surface comes in contact with, and adhered to, the leading edge of the outer label front surface.

At step 2370, the outer label is rotated with respect to the inner label to break the adhesive bond formed by the temporary adhesive between the outer label and the inner label.

Figure 24:
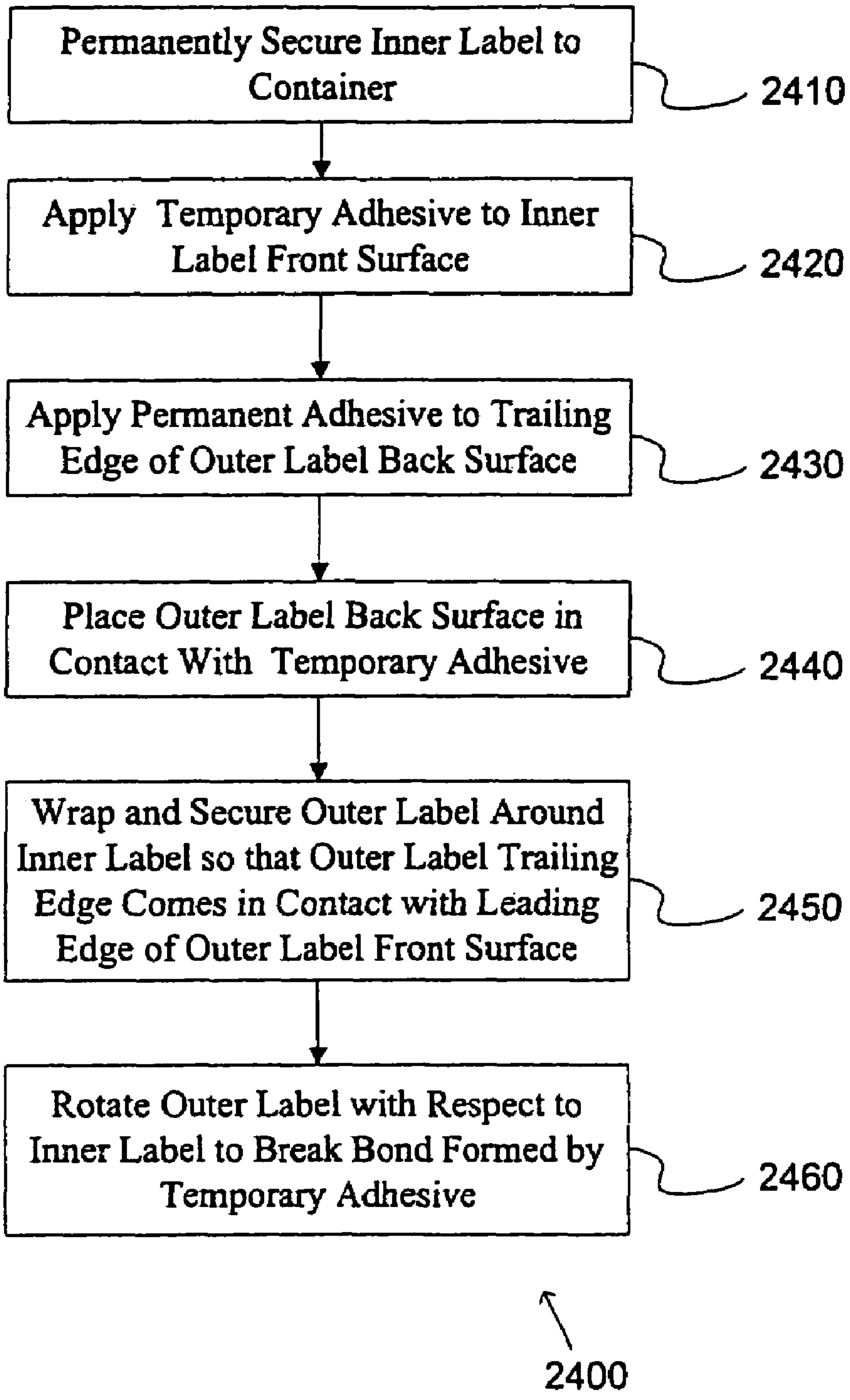
FIG. 24 illustrates a flowchart of steps for constructing a rotatable label system according to another embodiment of the present invention.

FIG. 24 is a flowchart 2400 illustrating steps for constructing a rotatable label system according to one embodiment of the present invention. The method 2400 may be employed with the labels described above in conjunction with FIGS. 1–5 and 6–12. At step 2410, cut and stack labeling machinery permanently secures an inner label to a container. Alternatively, step 2410 can be skipped and instead text can be printed directly on the container. At step 2420, labeling machinery applies temporary adhesive to the inner label front surface. Alternatively, the temporary adhesive can be applied to the container's outer surface if there is no inner label. At step 2430, labeling machinery applies permanent adhesive to the trailing edge of the outer label back surface. At step 2440, labeling machinery places the leading edge of the outer label back surface in contact with the inner label, thereby temporarily securing the outer label to the inner label. At step 2450, the labeling machinery wraps and secures the outer label around the inner label so that the trailing edge of outer label back surface comes in contact with the leading edge of the outer label front surface. At step 2460, the label machinery rotates the outer label with respect to the inner label to break the bond formed by the temporary adhesive between the outer label and the inner label.

Those skilled in the art will appreciate that either the cut-and-stack labeling machinery, roll-fed labeling machinery, or both, may be employed to apply the inner and outer labels to the container. For example, a roll-fed machine may apply the inner label and a cut-and-stack machine may apply the outer label, or vice versa. Alternatively, cut-and-stack machinery or roll-fed machinery may be used to mount both an inner label and an outer label to a container.

Figure 25:
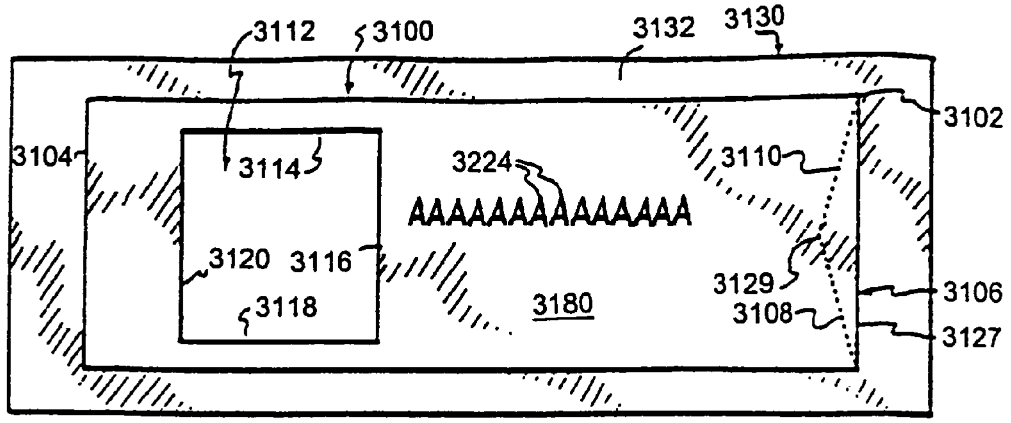
FIG. 25 is a side elevational view of a label according to the present invention.

FIG. 25 illustrates an outer label or shell 3100 according to the present invention. As shown, the outer label 3100 includes a first end 3102 and a second end 3104. A release tab 3106 is removably attached to the label 3100 at the first end 3102 by a perforated attachment comprising perforated edges 3108 and 3110. In this configuration, the label 3100 may be detached from the release tab 3106 along the perforated edges 3108 and 3110 after being wrapped around a container as discussed below.

The outer label 3100 also includes a transparent portion 3112. The transparent portion 3112 is illustrated as being defined by edges 3114, 3116, 3118, and 3120. The transparent portion 3112 may include an open window with no material disposed between the edges 3114–3120. Alternatively, the transparent portion 3112 may comprise a transparent film or the like to permit viewing through the transparent portion 3112. As discussed in more detail below, the transparent portion 3112 permits an exterior of an underlying container, or underlying label, to be viewed through the outer label 3100.

A strip of adhesive 3122 is shown as being disposed on a rear surface 3124 of the outer label 3100 adjacent to the label second end 3104 and is further defined by an edge 3128. Advantageously, with the exception of the strip of adhesive 3122, the outer label 3100 rear surface 3124 is substantially non-adhesive. As is discussed in more detail below, the adhesive strip 3122 secures the label second end 3104 to the outer label front surface 3180 to form a rotatable label when the outer label 3100 is wrapped about an object, such as a container.

The release tab 3106, as discussed above, is releasably attached to the outer label 3100. In particular, the release tab 3106 has a rear surface 3126 with an adhesive applied thereon. The release tab 3106 is used to couple the outer label 3100 to a container, while the outer label 3100 is being wrapped around the object. In this embodiment, the release tab 3106 is advantageously shaped in a substantially triangular manner with a release tab back edge 3127 being positioned opposite a release tab apex 3129. As shown, the release tab apex 3129 is located at the intersection of the perforated edges 3108 and 3110.

Figure 26:
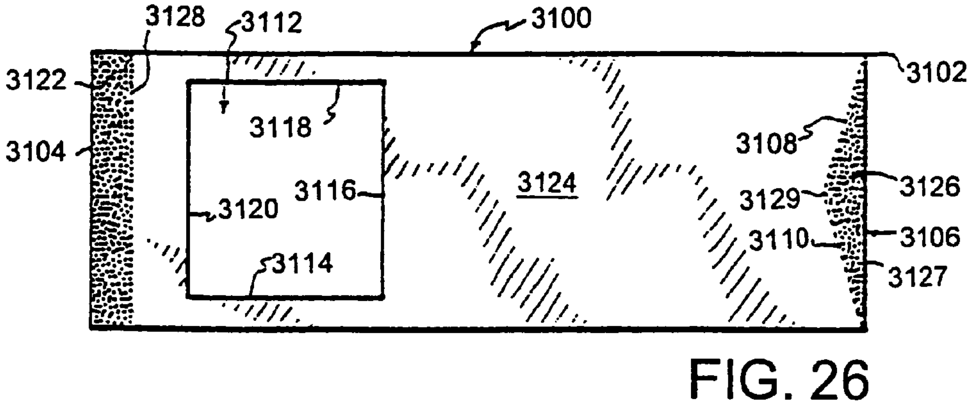
FIG. 26 is a side elevational view of the label of FIG. 25 secured to a liner.

FIG. 26 illustrates the outer label 3100 secured to a liner 3130 to protect the adhesive strip 3122 and the release tab adhesive rear surface 3126 until just prior to the application of the outer label 3100 to the object, such as a container. As shown, the adhesive strip 3122 and the release tab adhesive rear surface 3126 are adhered to a front surface 3132 of the liner 3130. In this configuration, the adhesive strip 3122 and the adhesive surface 3126 will not inadvertently adhere to anything other than the liner front surface 3132 until the outer label 3100 is ready to be applied to an object, such as a container. As discussed below, the liner 3130 is peeled away from the label 3100 and the release tab 3106 just prior to applying the label to a container.

Figure 27:
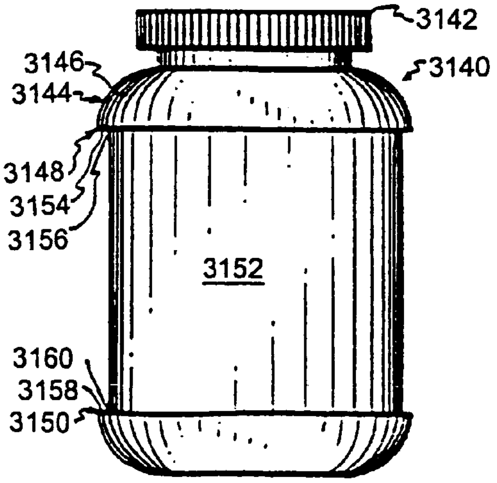
FIG. 27 illustrates a container having label panels in accordance with the present invention.

FIGS. 27–32 illustrate the application of the outer label 3100 to a container 3140. FIG. 27 shows the container 3140 as having a cap 3142 removably secured to a body 3144. The base 3144 has a exterior surface 3146 that includes a top label panel 3148, a bottom label panel 3150, and a recessed surface 3152 interposed between the top and bottom label panels. As discussed below, the outer label 3100 is applied to the container 3140 between the top label panel 3148 and the bottom label panel 3150. After the outer label 3100 is secured about the container 3140, the top and bottom label panels 3148 and 3150 limit the longitudinal displacement of the outer label 3100 relative to the container 3140. Limiting the longitudinal displacement of the outer label 3100 on the container 3140 prevents the outer label 3100 from slipping off the container 3140.

The top label panel 3148, as shown in FIG. 27, includes a transverse annular edge 3154 that intersects the recessed surface 3152 along an annular corner 3156. Similarly, the bottom label panel 3150 includes a transverse annular edge 3158 that intersects the recessed surface 3152 along an annular corner 3160. In this configuration, as discussed below, the label panels 3148 and 3150 limit longitudinal movement of the outer label 3100 along the longitudinal axis of the container 3140. In particular, the outer label 3100 is maintained between the transverse edges 3154 and 3168 of the label panels 3148 and 3150.

Figure 28:
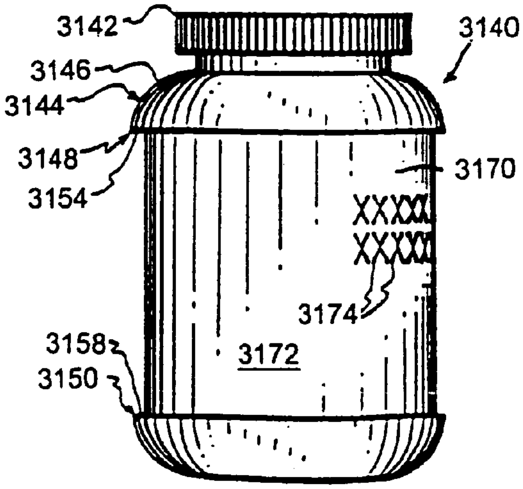
FIG. 28 illustrates the container of FIG. 27 having a fixed, non-rotatable label adhered thereto.

FIG. 28 illustrates the container 3140 having a base label 3170 affixed to the recessed surface 3152 between the transverse edges 3154 and 3158 of the label panels 3148 and 3150 respectively. The base label 3170 is shown as having a base label front surface 3172 with written indicia 3174 disposed thereon. The written indicia 3174 may include text, graphics, artwork, and the like. Moreover, the information conveyed by the written indicia 3174 may include product directions for use, warnings, dosage amounts, instructions, ingredients, nutritional data, advertisements, artwork, and the like.

Figure 29:
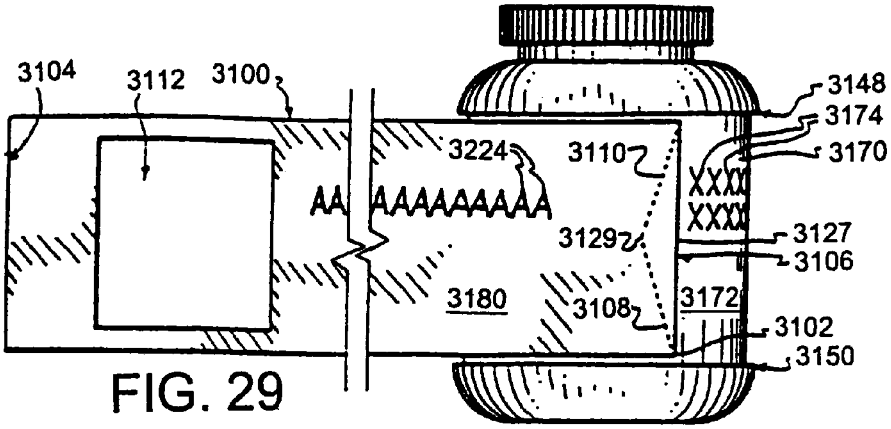
FIG. 29 illustrates the label of FIG. 25 coupled to the container of FIG. 27 in accordance with the present invention.

FIG. 29 shows the outer label 3100 of FIGS. 25 and 26 coupled to the container 3140 via the fixed label 3170. Specifically, the adhesive rear surface 3126 (FIG. 25) of the release tab 3106 is adhered to the front surface 3172 of the label 3170 between the label panels 3148 and 3150. Advantageously, the release tab 3106 is carefully positioned on the label front surface 3172 so that the release tab 3106 does not cover written indicia 3174 disposed on the label front surface 3172. In this manner, the label first end 3102 is coupled to the container 3140 while the outer label 3100 is wrapped around and secured about the container 3140, as discussed in more detail below.

Figure 30:
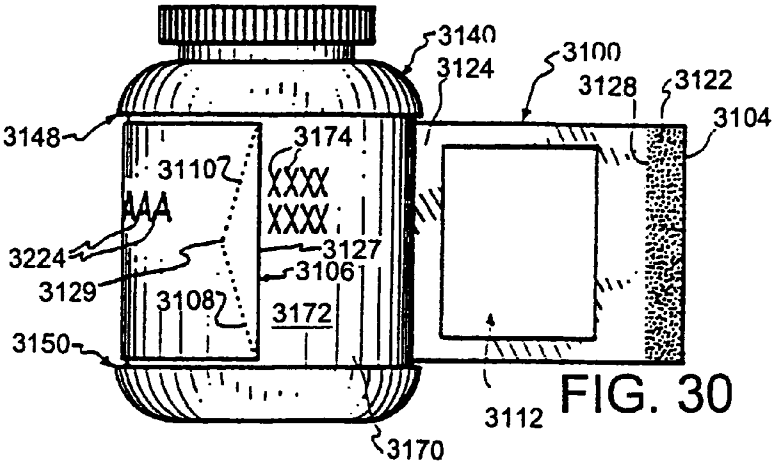
FIG. 30 illustrates the label of FIG. 25 partially wrapped about the container of FIG. 27 in accordance with the present invention.

FIG. 30 shows the outer label 3100 partially wrapped around the container 3140. As illustrated, the release tab 3106 is adhered to the front surface 3172 of the label 3170 between the label panels 3148 and 3150. Preferably, the rear surface 3124 of the outer label 3100 is snugly positioned against the front surface 3172 of the label 3170. To enhance the ability of the outer label 3100 to rotate relative to the label 3170, a slip agent (not shown), such as a silicon-based slip agent, may be disposed between the label surfaces 3124 and 3172.

Figure 31:
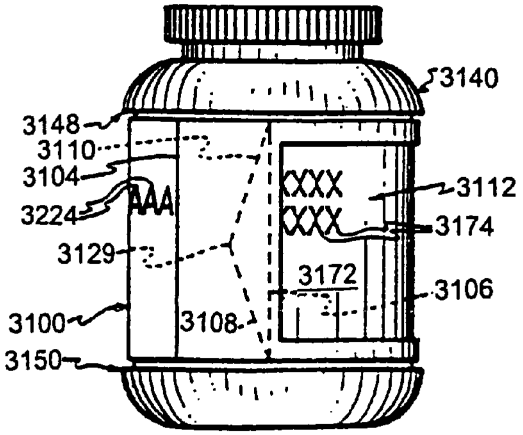
FIG. 31 illustrates the label of FIG. 25 secured about the container of FIG. 27 in accordance with the present invention.

FIG. 31 shows the outer label 3100 secured about the container 3140 with the second edge 3104 of the outer label 3100 adhered to a front surface 3180 of the outer label 3100. As shown, the adhesive strip 3122 is adhered to the front surface 3180 adjacent to the apex 3129 of the release tab 3106 (illustrated in phantom lines). In the configuration illustrated in FIG. 31, the outer label 3100 is removably attached to the label 3170 by the release tab 3106. Specifically, the release tab 3106 is releasably attached to the outer label 3100 and adhered to the inner label 3170. Hence, in this embodiment, for the outer label 3100 to be rotatable relative to the inner label 3170, the release tab 3106 must be detached from the outer label 3100.

Figure 32:
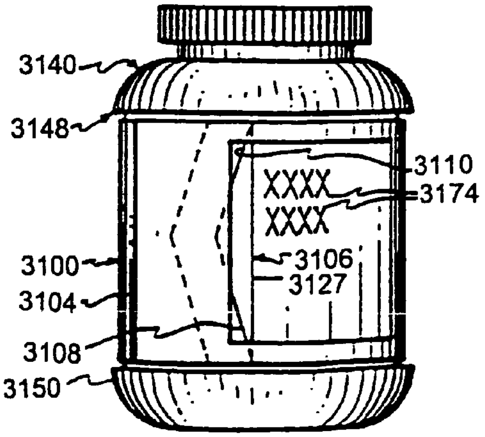
FIG. 32 illustrates the label of FIG. 25 rotatably mounted about the container of FIG. 27 in accordance with the present invention.

FIG. 32 shows the release tab 3106 detached from the outer label 3100 to permit the outer label 3100 to rotate about the container 3140 relative to the label 3170. As shown, the release tab 3106 is detached from the outer label 3100 by rotating the outer label 3100 relative to the label 3170 and, thus, applying a tensile stress to the perforated edges 3108 and 3110. FIG. 32 shows the perforated edges 3108 and 3110 being broken by rotating the outer label 3100 slightly clockwise, as viewed from above. By applying stress to the perforated edges 3108 and 3110, the perforated attachment fails and detaches the release tab 3106 from the outer label 3100. The release tab 3106 remains adhered to the inner label 3170.

In the configuration depicted in FIG. 32, the outer label 3100 is not adhered to the label 3170 or to the container and does not have the release tab 3106 attached thereto and, as such, the outer label 3100 is permitted to rotate relative to the label 3170. Moreover, the outer label 3100 is maintained longitudinally on the container 3140 by the label panels 3148 and 3150. Consequently, the written indicia 3174 on the underlying label front surface 3172 can be viewed through the transparent window 3112 by rotating the outer label 3100 about the container 3140.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A system for providing a rotatable label about an object, the system comprising:

an inner label comprising a front surface, the front surface having indicia disposed thereon, the inner label configured to be affixed about the object;

an outer label comprising a leading edge and a trailing edge, a front surface and a back surface, and a transparent region for viewing underlying indicia disposed on the front surface of the inner label;

a temporary adhesive disposed on the front surface of the inner label, the temporary adhesive temporarily coupling the back surface of the outer label to the front surface of the inner label while the outer label is wrapped about the inner label; and a permanent adhesive disposed adjacent to the trailing edge of the back surface of the outer label, the permanent adhesive securing the back surface of the trailing edge of the outer label to the front surface of the outer label, the breaking of the temporary adhesive allowing the outer label to rotate about the inner label.

2. The system of claim 1, wherein written indicia is disposed on the front surface of the outer label.

3. The system of claim 1, wherein the temporary adhesive comprises at least one dot of temporary hot cement.

4. The system of claim 1, wherein a slip agent is disposed on the front surface of the inner label.

5. A label application method comprising:

providing an inner label having a front surface with indicia disposed thereon;

affixing the inner label about an object;

providing an outer label having a leading edge and a trailing edge, a front surface and a back surface, and a transparent region for viewing underlying indicia;

disposing a temporary adhesive on the back surface of the outer label;

wrapping the outer label about the inner label, the temporary adhesive temporarily coupling the back surface of the outer label to the front surface of the inner label; and disposing a permanent adhesive adjacent to the trailing edge of the back surface of the outer label, the permanent adhesive securing the back surface of the trailing edge of the outer label to the front surface of the outer label, wherein the breaking of the temporary adhesive allows for the outer label to rotate about the inner label.

* * * * *